US005645133A

United States Patent [19]

Thompson et al.

[11] Patent Number: 5,645,133

[45] Date of Patent: Jul. 8, 1997

[54] PIVOTABLE HOOD STRUCTURE

[75] Inventors: John Lee Thompson, Madison; Barry Joseph Goebert; Eugene Gary Hayes, both of Beaver Dam; Richard Donald Teal, Horicon, all of Wis.

[73] Assignee: Deere & Company, Moline, Ill.

[21] Appl. No.: 503,110

[22] Filed: Jul. 17, 1995

[51] Int. Cl.[6] .............................. B62D 25/12; E05D 7/10

[52] U.S. Cl. .......................... 180/69.21; 16/254; 16/380; 16/386

[58] Field of Search .............................. 16/229, 254, 268, 16/380, 386; 180/69.21; D8/323

[56] References Cited

U.S. PATENT DOCUMENTS

| | | | |
|---|---|---|---|
| 4,415,052 | 11/1983 | Gauer | 180/69 R |
| 4,658,470 | 4/1987 | Oen | 16/241 |
| 4,683,613 | 8/1987 | Starke | 16/262 |
| 4,773,126 | 9/1988 | Voss | 16/288 |
| 4,805,264 | 2/1989 | Benning et al. | 16/267 |
| 4,831,655 | 5/1989 | Buettner | 381/69 |
| 4,889,203 | 12/1989 | Hagarty | 180/69.24 |
| 5,136,752 | 8/1992 | Bening et al. | 16/287 |
| 5,339,494 | 8/1994 | Essau et al. | 16/294 |

FOREIGN PATENT DOCUMENTS

| | | |
|---|---|---|
| 49406 | 6/1994 | Japan . |
| 46012 | 12/1960 | Switzerland . |

OTHER PUBLICATIONS

Deere & Co., 4 photographs taken by Deere employee of a Sears Craftsman Model 917,255441 Tractor Mower Hood Pivot Assembly, 1 page, dated Jun. 1995, published in the U.S.A.

Sears, Roebuck and Co., Sears Craftsman Model No. 917, 25541 Owner's Manual, front cover and page 24, Unknown, but prior to invention of applicants, published in the U.S.A.

Yanmar, brochure entitled "Here's Maxi News About A Mini Tractor For Yard and Garden, Small Farms, Estates", 12 pages (see particularly pages 3 and 4), dated 1984, published in the U.S.A.

*Primary Examiner*—Brian L. Johnson
*Assistant Examiner*—Avraham Lerner

[57] ABSTRACT

A pivotable hood structure is provided for use with a vehicle such as a lawn and garden tractor. The structure includes a pair of spaced apart pins carried on the tractor frame near the front end to be receivable in bracket openings carried on the hood. The bracket includes guide surfaces which aid in positioning the pins relative to the openings while also supporting the weight of the hood during installation and removal of the hood. A latching structure is provided between the pins and bracket to secure the pins in place. The pivotable hood structure provides a swingable mounting for the hood as well as quick mounting or removal of the hood without requiring the use of tools.

11 Claims, 5 Drawing Sheets

PIVOTABLE HOOD STRUCTURE

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

1. Field of the Invention

The present invention relates generally to vehicles, and more specifically to, a structure for swingably mounting a hood to a vehicle such as a lawn and garden tractor.

2. Description of Related Art

Access to the engine compartment of vehicles such as lawn and garden tractors is frequently necessary for making repairs, adjustments, and/or maintaining the engine and related components. Various mounting structures have been used to secure engine hoods, some permitting lifting or swinging separations of the hood from the engine compartment and others permitting a complete removal of the hood from the tractor. Such mounting structures, many of which employ pins, bolts, and similar structures, require the use of tools to enable the hood to be raised or removed from the tractor. After removal, these mounting structures usually require that the weight of the hood be supported by the operator as it is precisely positioned for reinstallation, thereby making installation difficult.

SUMMARY OF THE INVENTION

It would therefore be desirable to have a hood attachment structure that permits quick and easy access to the engine compartment as well as quick and easy removal of the hood when greater access is desired.

It would further be desirable to provide a hood attachment structure that is simple to remove or reinstall, requires no tools for removal or installation and one which could reliably secure the hood to the vehicle, whether raised or lowered. Further, it would be desirable to provide a hood mounting structure that permits the weight of the hood to be supported by the vehicle during the process of attaching it to or removing it from the vehicle.

Towards this end, there is provided a mounting structure composed of a pair of spaced apart pins carried by the tractor for engagement with spaced apart openings of a bracket mounted on the hood. A pair of guide surfaces on the bracket permit the hood to be supported on the vehicle frame while the pins are slidably positioned for alignment with openings in the bracket. A pair of fins are provided on one pin for alignment with keyway notches in one opening to prevent the pins from sliding out of the openings when the hood is swung into its mounted and closed position. Stops are also provided on the pins to signal when the pins are fully engaged as well as align the hood transversely on the vehicle.

With this structure, the hood is supported by the vehicle so it can be quickly and easily installed or removed without the use of tools. It can then be pivotally swung between the open and closed configurations and securely held in the open configuration since its center of mass is positioned forwardly of its pivoted connection with the vehicle.

DESCRIPTION OF THE PREFERRED EMBODIMENT

Figure 1:
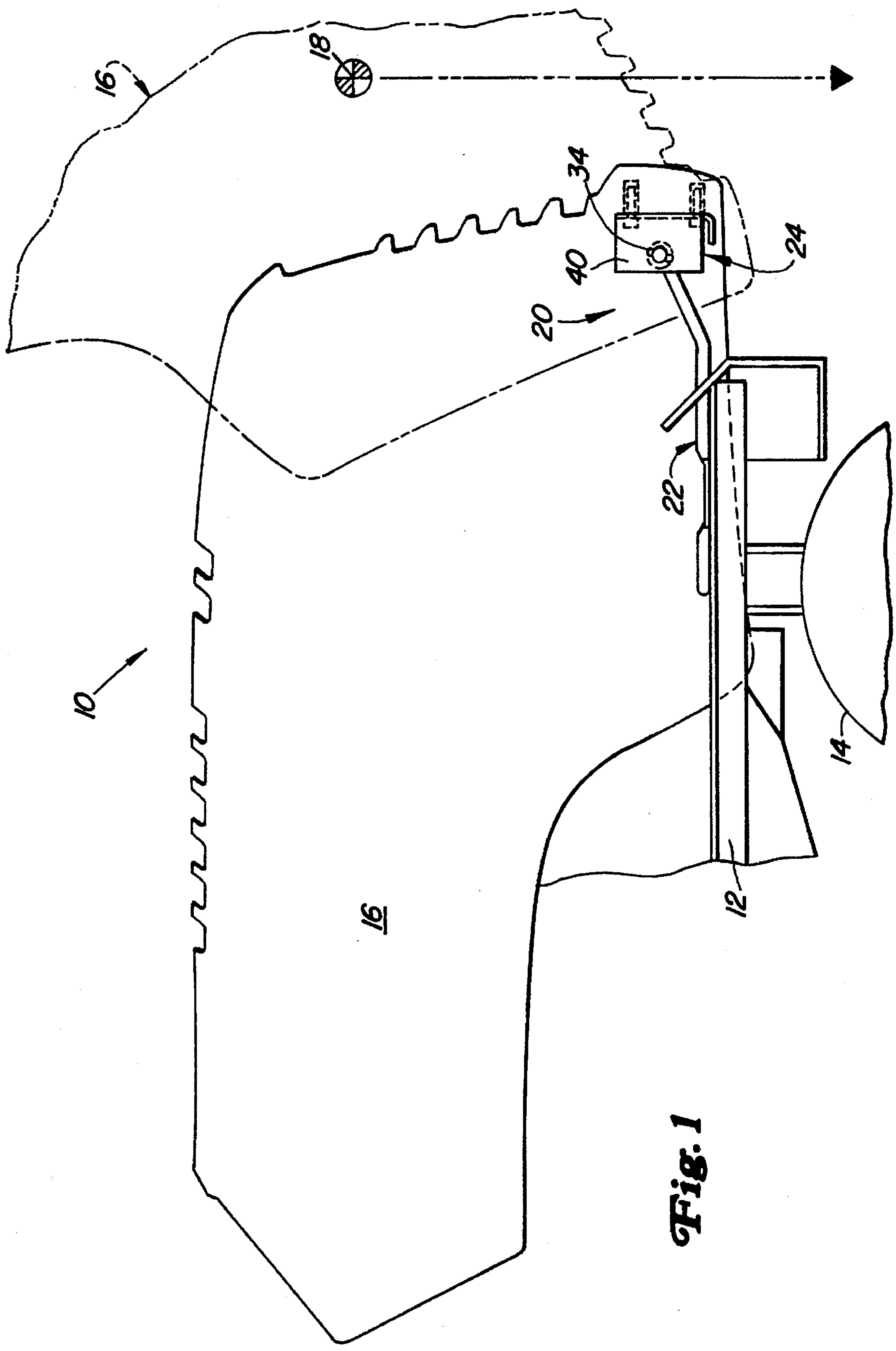
FIG. 1 is a schematic illustration of the engine hood in its closed configuration in solid lines and in its raised configuration in phantom.

Looking first to FIG. 1, there is illustrated in schematic form a partial tractor vehicle 10 including a frame 12, right front wheel 14, and hood 16 shown in its closed position in solid lines. The hood 16 is illustrated in phantom in its forwardly tilted position. In this position, the center of gravity 18 of the hood 16 is located forwardly of the pivotal mounting structure 20 coupling the hood 16 with the tractor 10. The mounting structure 20 for pivotally securing the hood 16 with the tractor frame 12 includes a rod means 22 secured with the frame 12 and a bracket means 24 secured with the hood 16.

Figure 2:
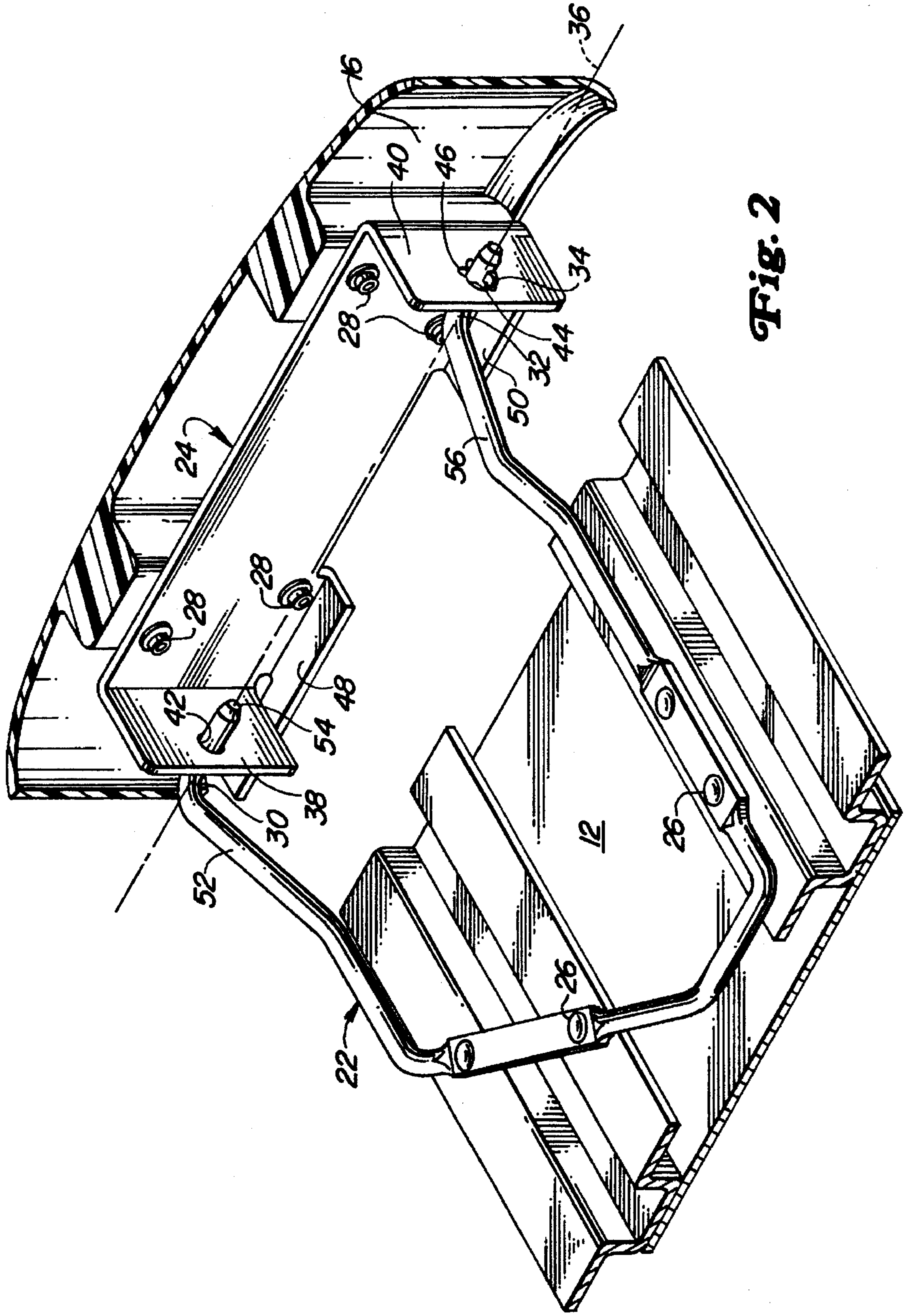
FIG. 2 is a side elevated perspective partial view illustrating the pivot mounting structure with the hood in its closed position.
Figure 3:
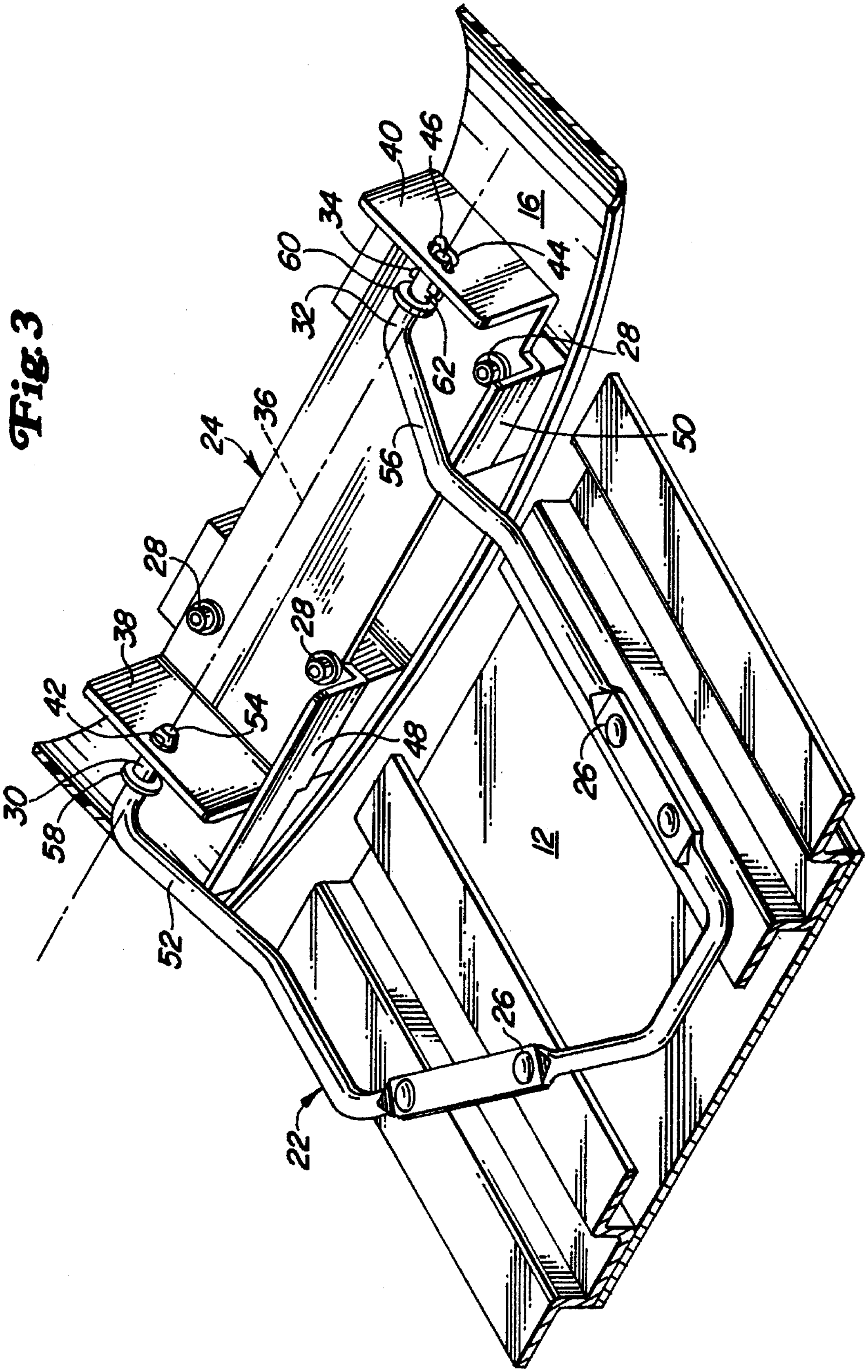
FIG. 3 is a side elevated rear perspective partial view illustrating the pivot mounting structure of the frame and hood with the hood in its position for removal from or installation onto the vehicle.

Looking now to FIGS. 2 and 3, there is illustrated in rear elevated perspective, a portion of the tractor frame 12 with the rod means 22 attached to it by rivets 26. Bolts, screws, welding or similar attaching structure could alternatively be used. Attached to the hood 16 is the bracket means 24 which forms the second basic part of the mounting structure 20. The bracket means 24 is preferably attached to the composite hood 16 of the preferred embodiment through the use of threaded bolts 28.

The rod means 22 includes first and second spaced apart end portions 30 and 32 with the second end portion 32 having latching means or fins 34 projected radially outwardly from the sides of a short length of the second rod end portion 32. Both end portions 30 and 32 of the rod means 22 are aligned with a transverse axis 36 to aid in alignment and positioning during installation.

The bracket means 24 is carried on the inside of the hood 16 at its forward lower portion (see FIG. 1 ). The bracket means 24 includes first and second spaced apart surfaces 38 and 40, formed as by bending of a flat material, into a generally C-shaped structure. The surfaces 38 and 40 have respective first and second openings 42 and 44 which are axially aligned to received the rod end portions 30 and 32.

The second surface 40 is provided with radially extending notches or keyways 46 through which the fins 34 of the second rod end portion 32 can be received.

Further provided on the bracket means 24 are first and second guide surfaces 48 and 50 respectively positioned adjacent the bracket means surfaces 38 and 40. The first guide surface 48 extends transversely left of the first surface 38 (as viewed in FIGS. 2 and 3) to a greater extent than does the second guide surface 50 extend left of the second bracket surface 40. As is apparent from the side view of FIG. 5, the guide surfaces 48 and 50 project rearwardly away from the surfaces 38 and 40 of the bracket means 24 to essentially the same degree.

Figure 6:
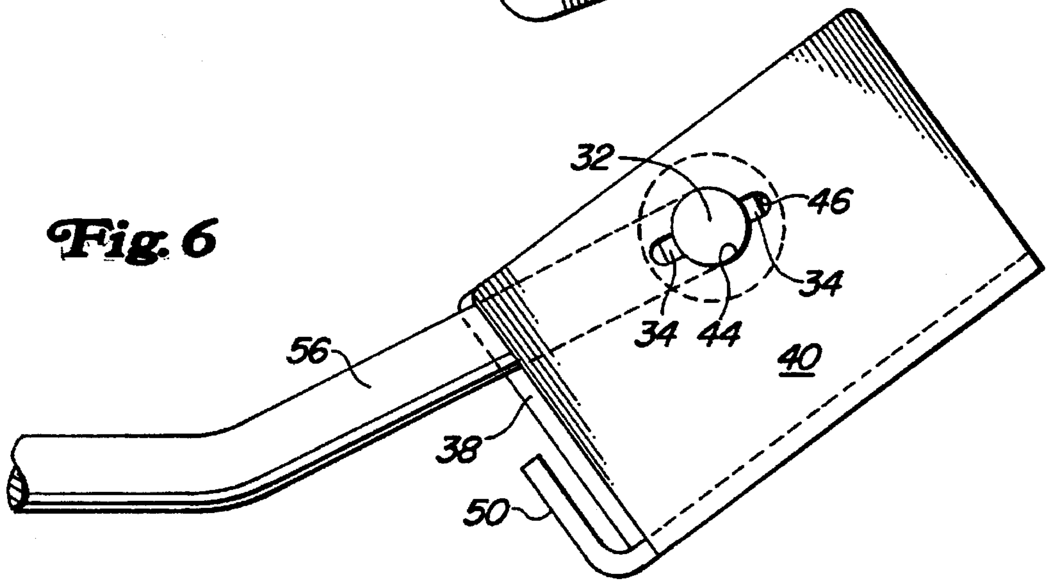
FIG. 6 is position similar to FIG. 4, illustrating the mounting components with the rod fins aligned with the keyways or notches for installation or removal of the hood onto the vehicle.
Figure 7:
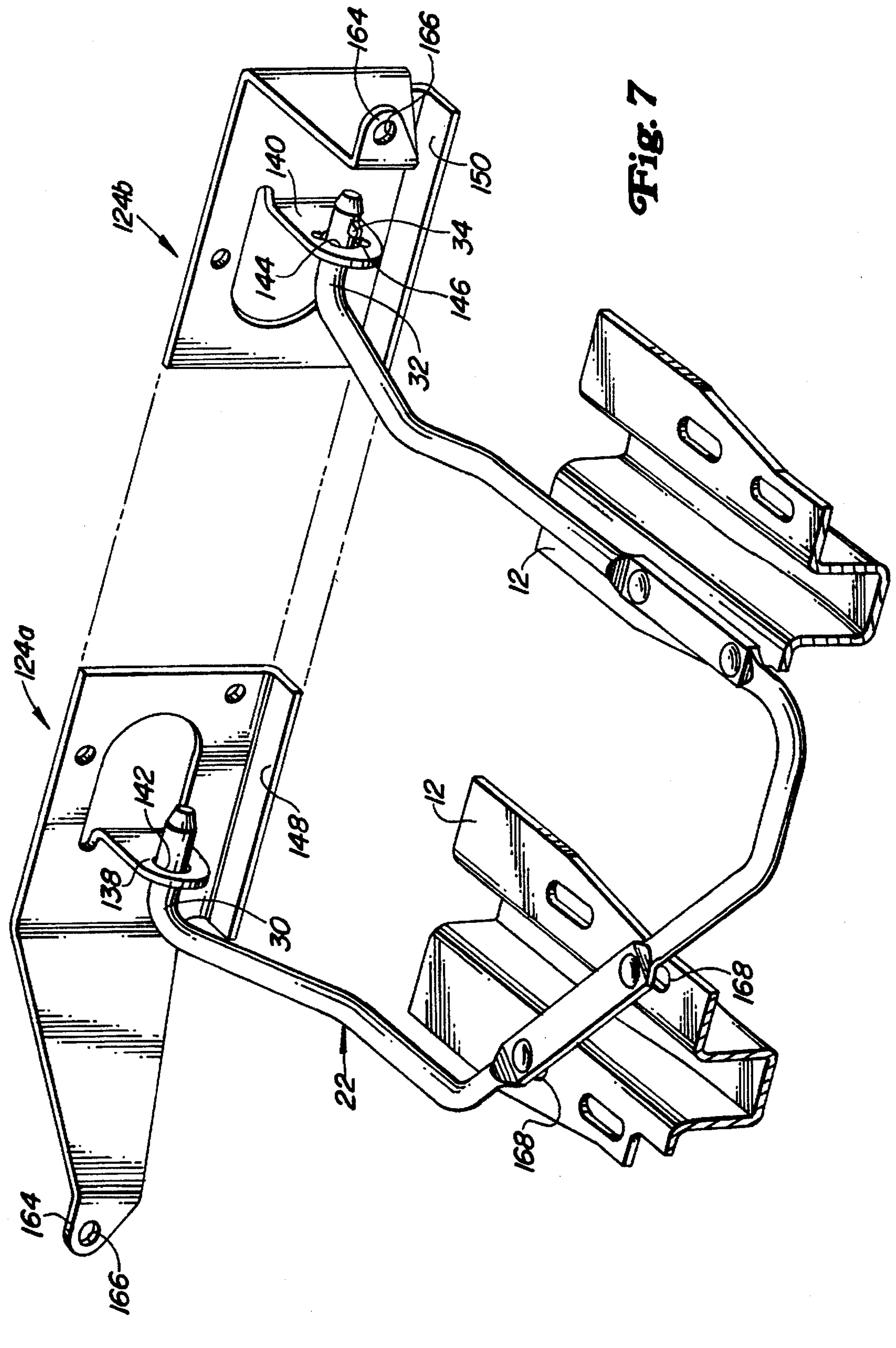
FIG. 7 is a side elevated perspective partial view illustrating an alternate mounting structure.

An alternative bracket means construction is illustrated in FIG. 7. This bracket means is comprised of two separate sub-brackets 124*a*, 124*b* and is intended to function the same as the bracket means 24 illustrated in FIGS. 1–6.

The sub-brackets 124*a*, 124*b* can be manufacted as separate stampings to reduce manufacturing costs or as a single bracket means if interconnected as illustrated with the dotted lines. The sub-brackets 124*a*, 124*b* include first and second spaced apart surfaces 138 and 140 with respective first and second openings 142 and 144 which are axially aligned to receive the rod portions 30 and 32. The second surface 140 is also provided with radially extending notches 146 through which the fins 34 of the second rod end portion 32 can be received. The sub-brackets further include first and second guide surfaces 148 and 150 which are positioned essentially the same as are the guide surfaces 48 and 50 of the FIG. 2–3 bracket means.

The sub-brackets 124*a*, 124*b* are each further provided with attaching ears 164 wherein openings 166 are formed to provide for additional attaching points to the hood 16. This type of additional attaching points can be provided as desired to better distribute the bracket loading to the hood 16. Also provided in the vehicle frame 12 are slotted attaching openings 168 which permit slight fore-and-aft adjustment of the rod means 22 on the vehicle.

Figure 4:
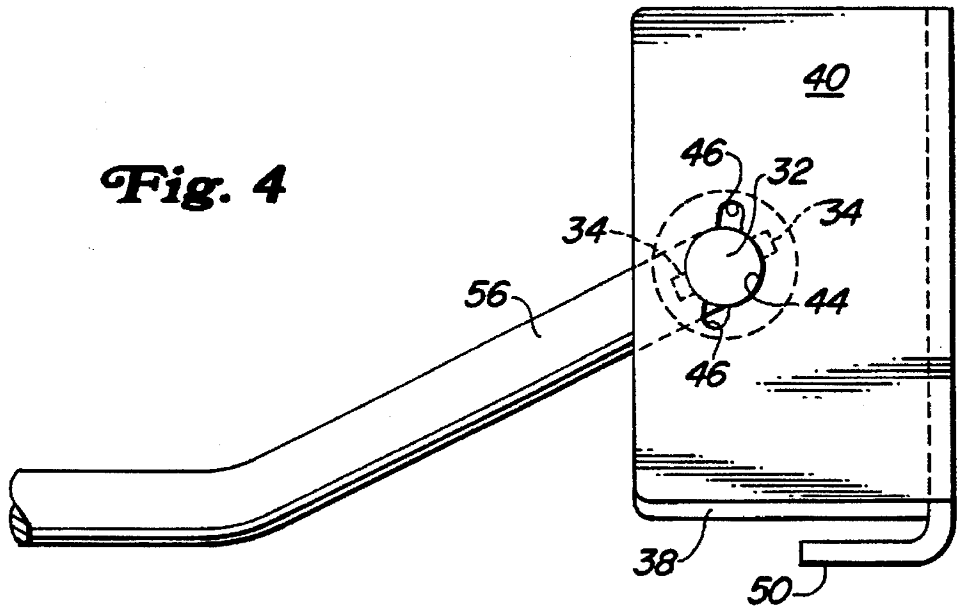
FIG. 4 is a schematic side view of the mounting structure illustrating the position of the components when the hood is in its closed position.
Figure 5:
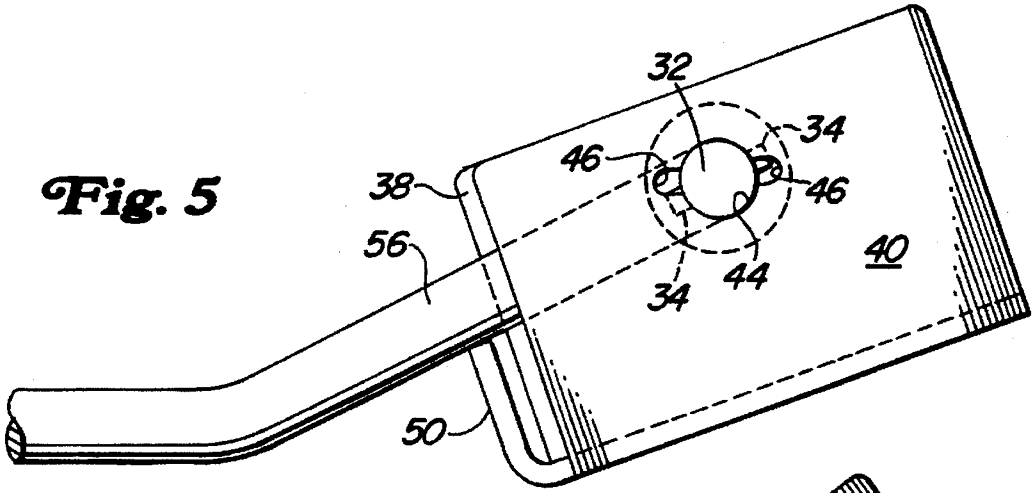
FIG. 5 is a view similar to FIG. 4 illustrating the position of the mounting structure component when initially installing the hood onto the vehicle or when the hood is in its open position.

Looking now to FIGS. 4, 5, and 6, there is illustrated the orientations of the rod means 22 and bracket means 24 when the hood 16 is respectively closed, open and then as it is when being installed or removed. These figures illustrate a side view of the second surface 40, the second rod means end portion 32, the second opening 44 and the second guide surface 50.

Looking first to FIGS. 3 and 6 to review the installation of the hood 16, it will be noted that the rod means 22 is carried on the top and forward portion of the vehicle frame 12. It projects forwardly in front of the vehicle to simplify installation of the hood 16. To install the hood 16, an operator first abuts the first leg 52 of the end portion 30 on the first guide surface 48. He would then slide the hood 16 sideways to the position illustrated in FIG. 3 so that the first tip 54 of the rod end portion 38 is closely aligned with the first opening 42 of the first surface 38. As the operator slides the bracket means 24 and hood 16 transversely to the left, as viewed in FIG. 3, the tip 54 of the first end portion 30 of the rod means 22 passes into the first opening 42. The length of the first end portion 30 is sized such that it can be partially inserted into the first opening 42 before the second end portion 32 begins to pass into the second opening 44. As the hood 16 is moved further to the left as viewed in FIG. 3, the second leg 56 of the end portion 32 would come into contact with the second guide means 50 to align the second end portion 32 With the second opening 44 of the second surface. During this process, the hood mounting components would be essentially as viewed in FIGS. 3 and 5.

As the legs 52 and 56 are further moved along the first and second guide surfaces 48 and 50 to insert end portions 30 and 32 into the openings 42 and 44, the hood 16 must be sightly rotated to align the fins 34 with the keyway or notches 46 in the second opening 44 (see FIG. 6). Each end portion 30 and 32 of the rod means 22 is provided with a stop 58 and 60 to limit the entry of the end portion 30 and 32 through its respective opening 42 and 44. The small lateral space 62 between the stop 60 and fins 34 effectively serves to transversely align the hood 16 with the vehicle frame 12, that alignment being restricted to the transverse space 62 between the fins 34 and the stop 60 of the second end portion 32 of the rod means 22.

To swing the hood 16 back and into place over the engine compartment, the operator next rotates the hood 16 about the axis 36 through the end portions 30 and 32 to swing the hood 16 into the orientation illustrated in solid lines in FIG. 1. In this hood-closed position, the mounting components will be as illustrated in FIG. 4. Since the fins 34 are now out of alignment with the keyways 46, as illustrated in FIG. 4, the hood 16 is locked or secured with the vehicle frame 12.

To open the hood 16, to the position illustrated in phantom in FIG. 1, and provide access to the engine compartment, the operator would simply lift the hood 16, pivoting the bracket means 24 about the axis 36 through the end portions 30 and 32 so that the mounting components are in the orientation as illustrated in FIG. 5. In this position, the guide surfaces 48 and 50 would abut the legs 52 and 56 of the end portions 30 and 32 to support the hood 16 in the position illustrated in phantom in FIG. 1 since the center of gravity 18 of the hood 16 is forwardly of the pivot axis 36.

When removal of the hood 16 is desired, the operator simply rotates the hood 16 to the position illustrated in FIG. 6 to align the notches 46 of the second opening 44 with the fins 34 of the second rod end portion 32 so that the hood 16 can be moved to the right, as viewed in FIG. 3, whereupon the end portions 30 and 32 can be removed from the openings 42 and 44. As the hood 16 is slid sideways, the weight of the hood 16 can be transferred through the guides 48 and 50 and to the rod means 22 to minimize the weight that the operator must support during the removal process.

With the present mounting structure, there is provided a means for quickly and easily mounting a hood onto a tractor frame where the weight of the hood can be supported in large part by the tractor frame during that operation. No tools are required as the end portions of the pins are aligned with the openings and the locking and latching features of the fins and notches provide a simple and easy method for securing the hood in place as it is swung between its open and closed position or supported in the completely open position.

We claim:

1. For use of a vehicle having a first frame member and a second body member;

means between the first and second members for removably securing one member with the other including:

a guide structure carried by one member, bracket means carried by the one member, the bracket means having first and second spaced apart surfaces with respective first and second openings, the first surface being adjacent to the guide structure and the second surface including receivable locking means;

rod means carried by the other member, the rod means having first and second spaced apart end portions with the second end portion having latching means;

said first and second end portions being respectively receivable in the first and second openings of the surfaces;

the first end portion being registerable with the guide member and slidable therealong to position the first end portion in the first opening and align the second end portion in the second opening whereby the latching means can be lockably received in the locking means when the second portion is received in the second opening.

2. The invention defined in claim 1 wherein the first member is a frame and the second member is a hood adapted for being removably secured with the frame.

3. The invention defined in claim 1 wherein each of the end portions take the form of an elongated rod with the two end portions being axially aligned.

4. The invention defined in claim 1 wherein the locking means takes the form of a keyway slot that extends radially outwardly from the edge of the opening and the latching means takes the form of a fin complementarily shaped for being received in the keyway.

5. The invention defined in claim 1 wherein one of the end portions is provided with a stop for limiting movement of the end portion through its corresponding opening.

6. The invention defined in claim 1 wherein there is provided a second guide structure on the bracket means which is registerable with the second end portion.

7. For use of a vehicle having a first frame member and a second body member;

means between the first and second members for removably securing one member with the other including:

a guide structure carried by one member, bracket means carried by the one member, the bracket means having first and second spaced apart surfaces with respective first and second openings, the first surface being adjacent to the guide structure and the second surface including a radially extending notch;

rod means carried by the other member, the rod means having first and second spaced apart end portions with the second end portion having at least one radially extending leg;

said first and second end portions being respectively receivable in the first and second openings of the surfaces;

the first end portion being registerable with the guide member and slidable therealong to position the first end portion in the first opening and align the second end portion in the second opening whereby the leg can be lockably received in the notch when the second portion is received in the second opening.

8. For use of a vehicle having a first frame member and a second body member;

means between the first and second members for removably and swingably securing one with the other including:

a guide structure carried by one member, bracket means carried by the one member, the bracket means having first and second spaced apart surfaces with respective first and second openings, the first surface being adjacent to the guide structure and the second surface including receivable locking means;

rod means carried by the other member, the rod means having first and second spaced apart end portions with the second end portion having latching means;

said first and second end portions being respectively receivable in the first and second openings of the surfaces;

the first end portion being registerable with the guide member and slidable therealong to removably position the first end portion in the first opening and align the second end portion in the second opening so that when the latching means is received in the locking means one member can be moved between a first position adjacent the second member and a second position swingably spaced from said second member.

9. The invention as defined in claim 8 wherein the one member is a hood and the other member is a vehicle frame.

10. The invention as defined in claim 9 wherein the hood is carried at the front portion of the vehicle for swingable movement up and away from the vehicle and towards the front with the center of mass of the hood being forwardly located of the vehicle when the hood is swingably spaced away from the vehicle.

11. The invention defined in claim 8 wherein the locking means is a notch carried adjacent the first opening and the latch means is a fin carried on the second end portion adapted for being received through the notch with a stop being carried on the, second end portion to limit movement of the second end portion through the opening.

* * * * *